(12) United States Patent
Kim et al.

(10) Patent No.: US 10,792,650 B2
(45) Date of Patent: Oct. 6, 2020

(54) METHOD OF PREPARING METAL OXIDE-SILICA COMPOSITE AEROGEL AND METAL OXIDE-SILICA COMPOSITE AEROGEL PREPARED THEREBY

(71) Applicant: LG CHEM, LTD., Seoul (KR)

(72) Inventors: Jong Hun Kim, Daejeon (KR); Hyun Woo Jeon, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 642 days.

(21) Appl. No.: 15/533,936

(22) PCT Filed: Oct. 19, 2016

(86) PCT No.: PCT/KR2016/011762
§ 371 (c)(1),
(2) Date: Jun. 7, 2017

(87) PCT Pub. No.: WO2017/069516
PCT Pub. Date: Apr. 27, 2017

(65) Prior Publication Data
US 2018/0193825 A1  Jul. 12, 2018

(30) Foreign Application Priority Data
Oct. 22, 2015 (KR) .................. 10-2015-0147511
Oct. 18, 2016 (KR) .................. 10-2016-0135244

(51) Int. Cl.
B01J 21/00 (2006.01)
B01J 31/02 (2006.01)
(Continued)

(52) U.S. Cl.
CPC .......... B01J 31/0212 (2013.01); B01J 21/02 (2013.01); B01J 31/02 (2013.01); C01B 13/14 (2013.01);
(Continued)

(58) Field of Classification Search
CPC ........ B01J 31/0212; B01J 31/02; B01J 21/02; B01J 31/0209; C01B 33/1585;
(Continued)

(56) References Cited

U.S. PATENT DOCUMENTS 3,131,072 A     4/1964  Taulli
2001/0034375 A1  10/2001 Schwertfeger et al.
(Continued)

FOREIGN PATENT DOCUMENTS

CN   1241952    1/2000
CN   101132856  2/2008
(Continued)

OTHER PUBLICATIONS

Dutoit et al., "Titania-Silica Mixed Oxides: I. Influence of Sol-Gel and Drying Conditions on Structural Properties," Journal of Catalysis 153 (1): 165-176 (1995).
(Continued)

*Primary Examiner* — Haytham Soliman
(74) *Attorney, Agent, or Firm* — Dentons US LLP

(57) ABSTRACT

The present invention relates to a method of preparing an ultra-light metal oxide-silica composite aerogel having high specific surface area and high pore volume and a metal oxide-silica composite aerogel prepared thereby. The preparation method according to the present invention may not only have good economic efficiency because production costs are relatively reduced in comparison to the related art, but may also effectively prevent the collapse of a pore structure by suppressing a shrinkage phenomenon during drying, and thus, a metal oxide-silica composite aerogel having ultra-light properties as well as high porosity characteristics, such as high specific surface area and high pore volume, may be prepared.

10 Claims, 3 Drawing Sheets

(51) Int. Cl.
  *C01B 33/158* (2006.01)
  *C01B 13/14* (2006.01)
  *B01J 21/02* (2006.01)

(52) U.S. Cl.
  CPC ........ *C01B 33/158* (2013.01); *C01B 33/1585* (2013.01); *C01P 2004/03* (2013.01); *C01P 2006/12* (2013.01); *C01P 2006/14* (2013.01); *C01P 2006/16* (2013.01)

(58) Field of Classification Search
  CPC ... C01B 33/158; C01B 13/14; C01P 2004/03; C01P 2006/14; C01P 2006/16; C01P 2006/12
  USPC .......................................................... 502/240
  See application file for complete search history.

(56) References Cited

U.S. PATENT DOCUMENTS

| | | |
|---|---|---|
| 2005/0079337 A1 | 4/2005 | Hashida et al. |
| 2008/0034968 A1 | 2/2008 | Nordberg |
| 2009/0001014 A1 | 1/2009 | Hua et al. |
| 2011/0000370 A1 | 1/2011 | Norberg et al. |
| 2015/0225630 A1 | 8/2015 | Hosoi et al. |

FOREIGN PATENT DOCUMENTS

| | | | |
|---|---|---|---|
| CN | 102863201 | 1/2013 | |
| JP | 2005008424 | 1/2005 | |
| JP | 2014-051643 A | 3/2014 | |
| KR | 10-2008-0084241 A | 9/2008 | |
| KR | 10-2010-0090989 A | 8/2010 | |
| KR | 10-2014-0146814 A | 12/2014 | |
| KR | 10-2015-0093123 A | 8/2015 | |
| WO | 2009002662 | 12/2008 | |
| WO | WO-2012044052 A2 * | 4/2012 | ................ B01J 2/08 |
| WO | 2014024482 | 2/2014 | |

OTHER PUBLICATIONS

Li et al., "Preparation of Cu—SiO2 composite aerogel by ambient drying and the influence of synthesizing conditions on the structure of the aerogel," Chinese Science Bulletin 56 (7): 685-690 (2011).
Einarsrud et al., "Strengthening of water glass and colloidal sol based silica gels by aging in TEOS," Journal of Non-Crystalline Solids 226 (1-2): 122-128 (1998).
Hwang et al., "Strengthening of water glass based aerogel by TEOS," Materials Science Forum 544-545: 1053-1056 (2007).
Haereid et al., "Thermal and Temporal Aging of Two Step Acid-Base Catalyzed Silica Gels in Water/Ethanol Solutions," Journal of Sol-Gel Science and Technology 8 (1-3): 153-157 (1997).

* cited by examiner

METHOD OF PREPARING METAL OXIDE-SILICA COMPOSITE AEROGEL AND METAL OXIDE-SILICA COMPOSITE AEROGEL PREPARED THEREBY

CROSS-REFERENCE TO RELATED APPLICATIONS

This application is a National Stage Application of International Application No. PCT/KR2016/011762, filed Oct. 19, 2016, and claims the benefit of Korean Patent Application Nos. 10-2015-0147511, filed on Oct. 22, 2015, and 10-2016-0135244, filed on Oct. 18, 2016, contents of which are incorporated herein by reference in their entirety for all purposes as if fully set forth below.

TECHNICAL FIELD

The present invention relates to a method of preparing an ultra-light metal oxide-silica composite aerogel having high specific surface area and high pore volume and a metal oxide-silica composite aerogel prepared thereby.

BACKGROUND ART

Since a silica aerogel, as a high specific area, ultra-porous material having a porosity of about 90% to about 99.9% and a pore diameter of about 1 nm to about 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the silica aerogel is super-insulation having a thermal conductivity of 0.300 W/m·K or less which is lower than that of an organic insulation material such as a typical Styrofoam. Also, the aerogel may address fire vulnerability and generation of toxic gas in case of fire, i.e., fatal weaknesses of a typical organic insulation material.

In order to prevent structural collapse due to a shrinkage phenomenon occurred during drying, the silica aerogel is prepared by a method in which a hydrophobic silica aerogel is prepared and a surface modifier is then removed by pyrolysis.

Specifically, the silica aerogel is prepared by the steps of: preparing a silica sol by hydrolysis of tetra ethyl ortho silicate (TEOS) or water glass with an acid catalyst, adding a basic catalyst thereto, and performing a condensation reaction to prepare a hydrophilic wet gel (first step); aging the wet gel (second step); performing solvent substitution in which the aged wet gel is put in an organic solvent to substitute water present in the wet gel with an organic solvent (third step); preparing a hydrophobic wet gel by adding a surface modifier to the solvent-substituted wet gel and performing a modification reaction for a long period of time (fourth step); preparing a hydrophobic silica aerogel by washing and drying the hydrophobic wet gel (fifth step); and pyrolyzing the aerogel (sixth step).

Recently, in order to further extend applications of silica aerogel, a plan of improving mechanical properties in addition to original properties of the silica aerogel has been reviewed, and, for example, a metal oxide-silica composite aerogel, in which a metal oxide is introduced, is being developed.

In general, the metal oxide-silica composite aerogel is being prepared by the steps of: adding a metal ion solution and an acid catalyst to a water glass solution and performing a reaction to prepare a metal oxide-silica composite wet gel (step 1); and washing and drying the wet gel (step 2) (see FIG. 1). However, since a structure of the metal oxide-silica composite aerogel prepared by the above method is collapsed by a severe shrinkage phenomenon occurred during drying, the metal oxide-silica composite aerogel may have physical properties unsuitable for industrial applications, for example, a specific surface area and a pore volume are significantly reduced. Also, the step of washing the wet gel with an organic solvent having a low surface tension before the drying is performed to suppress the shrinkage phenomenon, but, since a shrinkage phenomenon suppression effect is limited, it is not suitable for the preparation of a metal oxide-silica composite aerogel having high specific surface area and high pore volume and economic efficiency may be reduced because a large amount of the organic solvent is required.

Thus, there is a need to develop a method which may prepare a metal oxide-silica composite aerogel having high specific surface area and high pore volume characteristics due to the fact that the shrinkage phenomenon during drying is effectively suppressed while having good economic efficiency because the large amount of the organic solvent is not required.

DISCLOSURE OF THE INVENTION

Technical Problem

An aspect of the present invention provides a method of preparing a metal oxide-silica composite aerogel which may prepare an ultra-light metal oxide-silica composite aerogel having high porosity characteristics, such as high specific surface area and high pore volume, by effectively suppressing a shrinkage phenomenon during drying while having good economic efficiency because production costs are reduced in comparison to the related art.

Another aspect of the present invention provides a metal oxide-silica composite aerogel prepared by the above preparation method.

Technical Solution

According to an aspect of the present invention, there is provided a method of preparing a metal oxide-silica composite aerogel including the steps of: adding a metal ion solution to a first water glass solution and performing a primary reaction to prepare a metal oxide-silica composite agglomerate (step 1); adding a second water glass solution and a second acid catalyst to the agglomerate and performing a secondary reaction to prepare a metal oxide-silica composite wet gel (step 2); and drying the metal oxide-silica composite wet gel (step 3), wherein the metal ion solution of step 1 includes a first acid catalyst, and the second water glass solution of step 2 is added in an amount of 5 vol % to 500 vol % based on 100 vol % of the first water glass solution.

According to another aspect of the present invention, there is provided a metal oxide-silica composite aerogel prepared by the above method.

Advantageous Effects

A method of preparing a metal oxide-silica composite aerogel according to the present invention may not only have good economic efficiency because production costs are relatively reduced in comparison to the related art, but may also effectively prevent the collapse of a pore structure by suppressing a shrinkage phenomenon during drying.

Furthermore, a metal oxide-silica composite aerogel prepared by the method according to the present invention may have ultra-light properties while having high porosity characteristics such as high specific surface area and high pore volume.

Thus, the preparation method according to the present invention is suitable for the aerogel industry.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a metal oxide-silica composite aerogel having ultra-light properties as well as high porosity characteristics such as a high specific surface area and a high pore volume.

Figure 1:
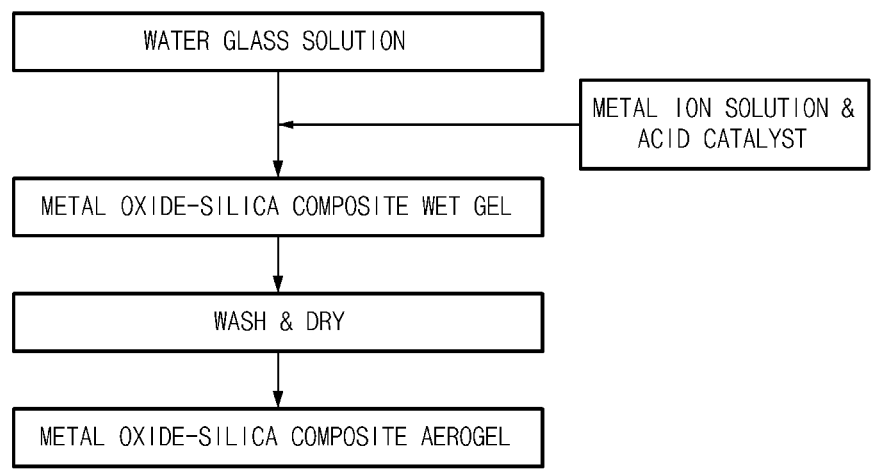
FIG. 1 schematically illustrates a flowchart of a conventional general method of preparing a metal oxide-silica composite aerogel.

In general, a metal oxide-silica composite aerogel is being prepared by the steps of: adding a metal ion solution and an acid catalyst to a water glass solution and performing a reaction to prepare a metal oxide-silica composite wet gel (step 1); and washing and drying the wet gel (step 2) (see FIG. 1). However, since a network structure of the metal oxide-silica composite aerogel prepared by the above method is collapsed by a severe shrinkage phenomenon occurred during drying, pore characteristics, such as a specific surface area and a pore volume, are degraded, and thus, the metal oxide-silica composite aerogel may be unsuitable for industrial applications. Also, the step of washing the wet gel with an organic solvent with a relatively low surface tension is performed before the drying to suppress the shrinkage phenomenon, but, since a shrinkage phenomenon suppression effect is limited, it is not suitable for the preparation of a metal oxide-silica composite aerogel having high specific surface area and high pore volume and economic efficiency may be reduced because a large amount of the organic solvent is required.

Thus, the present invention provides a method of preparing a metal oxide-silica composite aerogel having ultra-light properties as well as high porosity characteristics, such as a high specific surface area and a high pore volume, while having good economic efficiency due to reduced production costs.

Hereinafter, a method of preparing a metal oxide-silica composite aerogel according to an embodiment of the present invention will be described in detail with reference to FIGS. 2 and 3.

Figure 2:
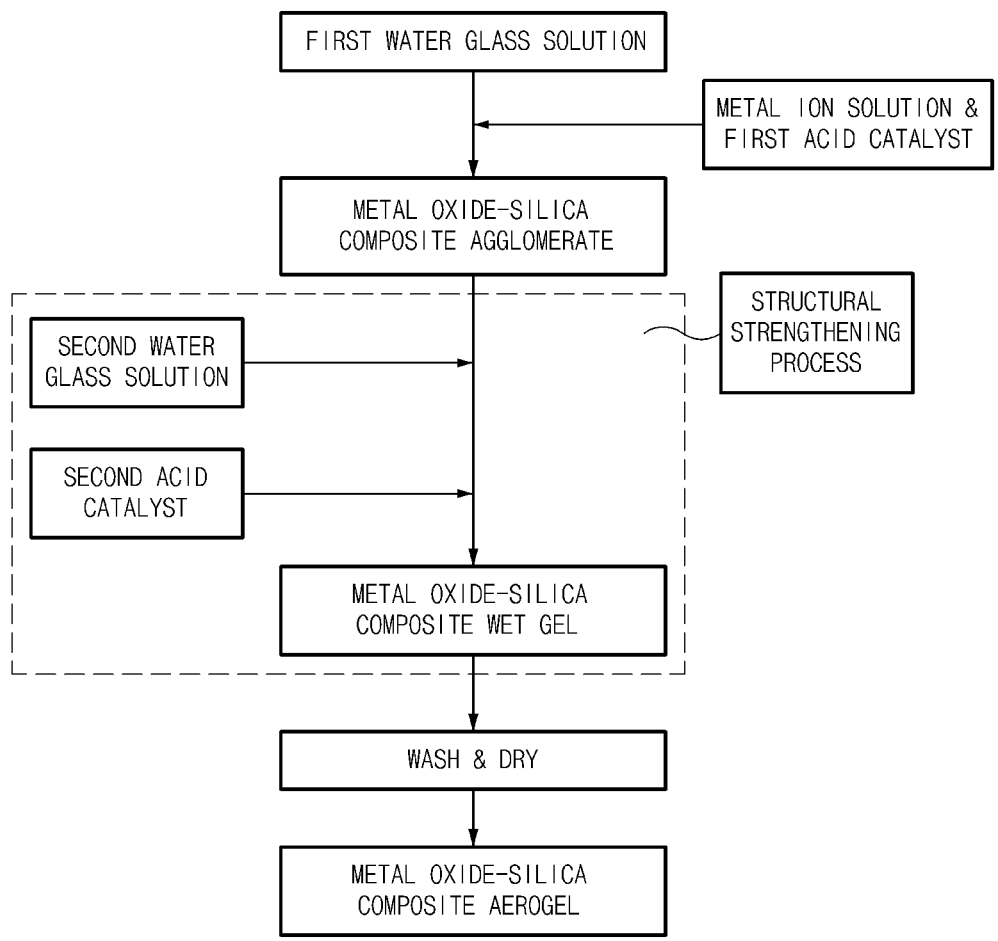
FIG. 2 schematically illustrates a flowchart of a method of preparing a metal oxide-silica composite aerogel through a one-step structural strengthening process according to an embodiment of the present invention.
Figure 3:
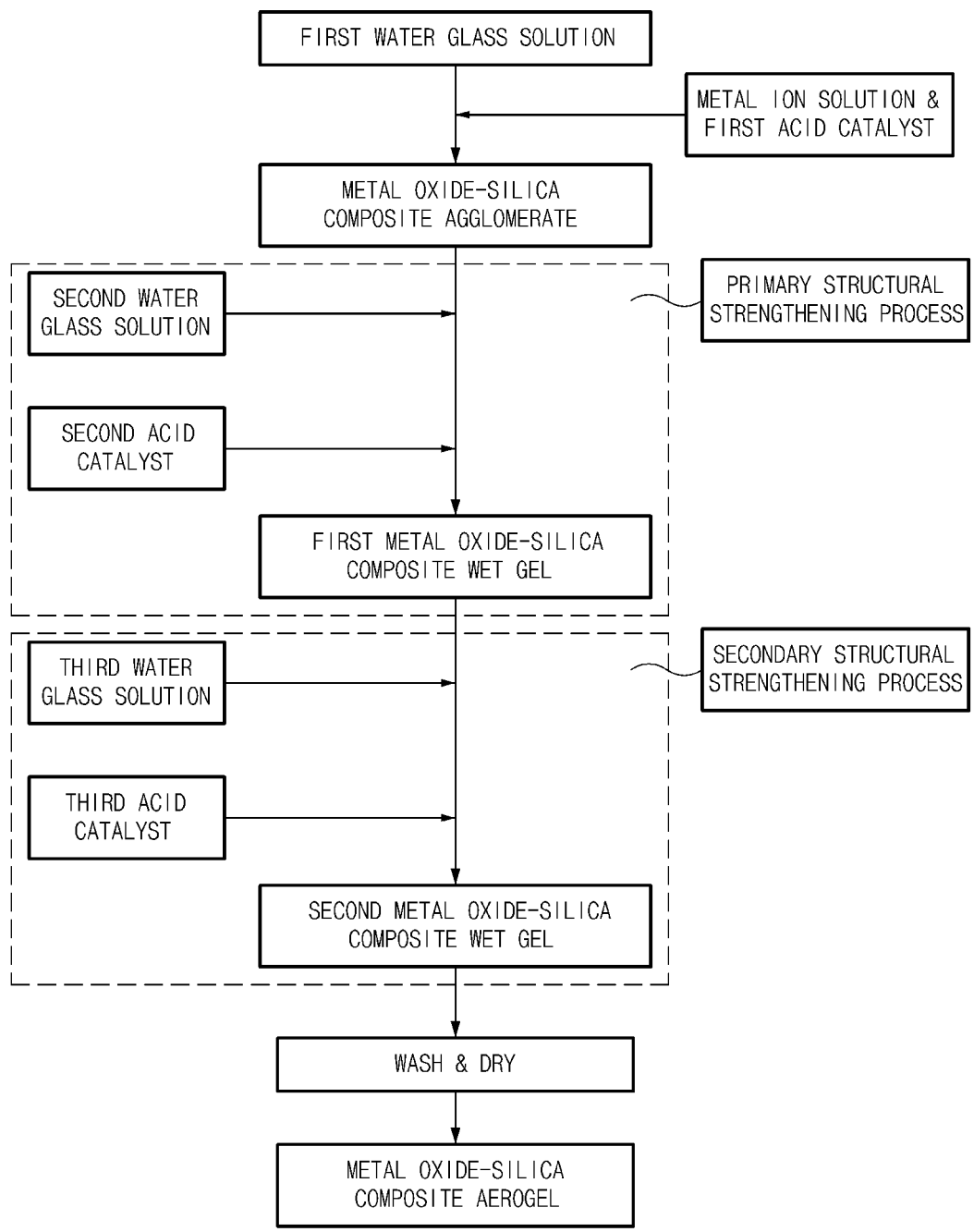
FIG. 3 schematically illustrates a flowchart of a method of preparing a metal oxide-silica composite aerogel through a two-step structural strengthening process according to an embodiment of the present invention.

FIG. 2 schematically illustrates a flowchart of a method of preparing a metal oxide-silica composite aerogel through a one-step structural strengthening process according to an embodiment of the present invention, and FIG. 3 schematically illustrates a flowchart of a method of preparing a metal oxide-silica composite aerogel through a two-step structural strengthening process according to another embodiment of the present invention.

The preparation method according to the embodiment of the present invention includes the steps of: adding a metal ion solution to a first water glass solution and performing a primary reaction to prepare a metal oxide-silica composite agglomerate (step 1); adding a second water glass solution and a second acid catalyst to the agglomerate and performing a secondary reaction to prepare a metal oxide-silica composite wet gel (step 2); and drying the metal oxide-silica composite wet gel (step 3), wherein the metal ion solution of step 1 includes a first acid catalyst, and the second water glass solution of step 2 is added in an amount of 5 vol % to 500 vol % based on 100 vol % of the first water glass solution.

In the expressions "first water glass solution", "second water glass solution", and "third water glass solution" used in the present invention, the water glass solution may denote a dilute solution, in which distilled water is added to water glass and mixed, and the water glass may be sodium silicate ($Na_2SiO_3$) as an alkali silicate salt obtained by melting silicon dioxide ($SiO_2$) and alkali. The expressions "first", "second", and "third" may be to distinguish the order of addition. That is, the expressions "first water glass solution", "second water glass solution", and "third water glass solution" may denote water glass solutions which are sequentially added in a primary reaction, a secondary reaction, and a tertiary reaction, respectively. Also, in some cases, these expressions may denote that a water glass concentration in each water glass solution is different.

In the expressions "first acid catalyst", "second acid catalyst", and "third acid catalyst" used in the present invention, the expressions "first", "second", and "third" may be to distinguish the order of addition. That is, the expressions "first acid catalyst", "second acid catalyst", and "third acid catalyst" may denote acid catalysts which are sequentially added in the primary reaction, the secondary reaction, and the tertiary reaction, respectively.

The expressions "primary reaction", "secondary reaction", and "tertiary reaction" used in the present invention may respectively denote sol-gel reactions, and the expressions "secondary reaction" and "tertiary reaction" may be processes for structural strengthening, respectively. Herein, the "sol-gel reaction" is a reaction that forms a network structure from a silicon or metal alkoxide unit precursor material, wherein the "sol-gel reaction" may denote a reaction in which, for example, after hydrolysis occurs in which silicon and water are reacted to form a hydroxy (—OH) functional group on metal, a reactant and a reactant are connected to each other and grow by condensation in which a single water molecule from two hydroxy functional groups simultaneously forms a metal-oxygen bond.

The expression "structural strengthening" used in the present invention denotes strengthening of a network structure formed by metal oxide-silica, wherein the structural strengthening may be performed by inducing the sol-gel reaction several times, and the expression "structure" used in the present invention may denote a network structure unless specifically mentioned otherwise. Herein, the network structure may denote a flat net-shaped structure, in which any specific polygons having one or more types of atomic arrangements are connected, or a structure in which a three-dimensional skeleton structure is formed by sharing vertices, edges, and faces of a specific polyhedron.

Step 1 is a step of preparing a metal oxide-silica composite agglomerate and may be performed by adding a metal ion solution to a first water glass solution and performing a primary reaction.

Specifically, step 1 is a step of preparing a metal oxide-silica composite agglomerate by adding the metal ion solution, after adding the first water glass solution to a reactor, and performing a primary sol-gel reaction. In this case, the metal oxide-silica composite agglomerate may denote a metal oxide-silica composite gel compound.

A concentration of water glass in the first water glass solution may be in a range of 0.125 M to 1.0 M. That is, the water glass solution may include the water glass in an amount of 0.125 M to 1.0 M. In a case in which the water glass concentration is less than 0.125 M, since the agglomerate forms an excessively large porous network structure and the shrinkage phenomenon during drying is intensified, a metal oxide-silica composite aerogel having poor physical properties, for example, very high tap density and low porosity, may be formed. In a case in which the water glass concentration is greater than 1.0 M, since the agglomerate may not form a porous network structure but forms a dense structure, a specific surface area of the finally-prepared metal oxide-silica composite aerogel may be reduced.

The metal ion solution may include a metal compound, a first acid catalyst, and a solvent, and, specifically, may be a mixture which is prepared by dissolving the metal compound in the solvent and adding and mixing the first acid catalyst. A concentration of metal ions in the metal ion solution may be in a range of 0.125 M to 1.0 M. Specifically, the metal ion solution may be a binary metal ion solution including calcium ions ($Ca^{2+}$) and magnesium ions ($Mg^{2+}$), and, in this case, a molar ratio of the calcium ion ($Ca^{2+}$) to the magnesium ion ($Mg^{2+}$) may be in a range of 1:0.3 to 1:3.0. That is, the metal ion solution may be one which is prepared by dissolving a calcium compound and a magnesium compound in the solvent, and the calcium compound and the magnesium compound may be a hydrate of calcium chloride and a hydrate of magnesium chloride, respectively. Specifically, the calcium compound may be calcium chloride dihydrate ($CaCl_2.2H_2O$), and the magnesium compound may be magnesium chloride hexahydrate ($MgCl_2.6H_2O$). Also, the solvent is not particularly limited as long as it may sufficiently dissolve the calcium compound and the magnesium compound, but, for example, may be distilled water.

Furthermore, the metal ion solution may have a pH of 0.1 to 4, and the pH may be adjusted by the first acid catalyst included in the metal ion solution.

Specifically, as described above, the metal ion solution may be a mixture, which is prepared by dissolving the metal compound in the solvent and adding and mixing the first acid catalyst, and a pH value before the addition of the first acid catalyst may be in a range of 8 to 11. That is, the metal ion solution may have the above pH range by including the first acid catalyst, and thus, the primary reaction to be described later may be easily performed. An amount of the first acid catalyst in the metal ion solution is not particularly limited, and the first acid catalyst may be included in an amount such that the pH value of the metal ion solution is within the above range.

The first acid catalyst is not particularly limited, but may, for example, be at least one selected from the group consisting of hydrochloric acid, nitric acid, acetic acid, sulfuric acid, and hydrofluoric acid. The first acid catalyst may be the same material as or a different material from the second acid catalyst and the third acid catalyst to be described later.

Also, the metal ion solution may be added in an amount such that the metal ions in the solution and the water glass in the first water glass solution may be easily reacted, and, specifically, the metal ion solution may be added so that a volume ratio of the first water glass solution to the metal ion solution is in a range of 5:1 to 1:5. For example, the metal ion solution may be added so that the volume ratio of the first water glass solution to the metal ion solution is 1:1. In a case in which the metal ion solution is added to the first water glass solution in an amount to achieve the above volume ratio range, since the first water glass solution and metal ion solution having different pH values are mixed to create a pH range favorable to the primary reaction, the metal oxide-silica composite agglomerate may be easily prepared.

In this case, the primary reaction may be performed in a pH range of 4 to 7, and, as described above, the pH range of the primary reaction may be adjusted by mixing the first water glass solution and metal ion solution having different pH values in the above volume ratio.

Also, the primary reaction is not particularly limited, but, for example, may be performed while stirring, and the stirring may be performed by rotating at 100 rpm to 500 rpm using a magnetic bar or mechanical mixer.

Step 2 is a step for preparing a metal oxide-silica composite wet gel in which the network structure is strengthened, wherein step 2 may be performed by adding a second water glass solution and a second acid catalyst to the metal oxide-silica composite agglomerate and performing a secondary reaction. In this case, the second water glass solution and the second acid catalyst may be sequentially added to the metal oxide-silica composite agglomerate.

Specifically, the secondary reaction, as a structural strengthening process for strengthening the network structure in the metal oxide-silica composite agglomerate, may be performed by inducing condensation through the addition of the second acid catalyst after the second water glass solution is added to the metal oxide-silica composite agglomerate to cause hydrolysis.

As described above, the second water glass solution may be added in an amount of 5 vol % to 500 vol % based on 100 vol % of the first water glass solution. Specifically, the second water glass solution may be added in an amount of 5 vol % to 300 vol %, for example, 20 vol % to 200 vol %, based on 100 vol % of the first water glass solution. Also, a concentration of water glass in the second water glass solution may be in a range of 0.5 M to 3.0 M, particularly, 0.8 M to 2.0 M.

Furthermore, the second acid catalyst may be added in an amount such that a pH value after the addition of the second acid catalyst is reduced by 40% to 65% of a pH value before the addition of the second acid catalyst. For example, the pH value before the addition of the second acid catalyst may be in a range of 8 to 10 and the pH value after the addition of the second acid catalyst may be in a range of 4 to 6.

Also, the preparation method according to the embodiment of the present invention may further include a step of adding a third water glass solution and a third acid catalyst and performing a tertiary reaction after the secondary reaction of step 2. In this case, the tertiary reaction, like the secondary reaction, may be a structural strengthening process, and the third water glass solution and the third acid catalyst may be sequentially added. That is, like the secondary reaction, the tertiary reaction may be performed by inducing condensation through the addition of the third acid catalyst after the third water glass solution is added to cause hydrolysis.

Herein, the third water glass solution may be added so that a total amount of the third water glass solution and the above-described second water glass solution is in a range of 20 vol % to 200 vol % based on 100 vol % of the first water glass solution. That is, an amount of the third water glass solution may be adjusted depending on the amount of the second water glass solution added, and, for example, in a case in which the second water glass solution and the third water glass solution are added together in a total amount of 100 vol % based on 100 vol % of the first water glass solution, if 60 vol % of the second water glass solution is added, the third water glass solution may be added in a remaining amount of 40 vol %.

Furthermore, the total amount of the second water glass solution and the third water glass solution is not particularly limited as long as the second water glass solution and the third water glass solution are added at the above-described ratio based on the first water glass solution, and the second water glass solution and the third water glass solution may be divided in an appropriate ratio according to purpose and added, but the second water glass solution may have a relatively larger ratio than the third water glass solution or may have the same ratio as the third water glass solution.

Also, a water glass concentration in the third water glass solution may be in a range of 0.5 M to 3.0 M, particularly, 0.8 M to 2.0 M. In this case, the third water glass solution may be the same as or different from the second water glass solution. That is, the second water glass solution and the third water glass solution may be simultaneously prepared at the same concentration and may be divided according to purpose to be respectively used in the secondary reaction and the tertiary reaction.

The third acid catalyst may be added in an amount such that a pH value after the addition of the third acid catalyst is reduced by 40% to 65% of a pH value before the addition of the third acid catalyst. For example, the pH value before the addition of the third acid catalyst may be in a range of 8 to 10 and the pH value after the addition of the third acid catalyst may be in a range of 4 to 6.

Hereinafter, the secondary reaction and the tertiary reaction will be described in more detail with reference to FIGS. 2 and 3.

The preparation method according to the embodiment of the present invention may include a structural strengthening process for strengthening the network structure in the metal oxide-silica composite agglomerate prepared in step 1, and the structural strengthening process may be a one-step structural strengthening process (see FIG. 2) in which the secondary reaction is only performed, or a two-step structural strengthening process (see FIG. 3) in which the secondary reaction and the tertiary reaction are sequentially performed, and may specifically be the two-step structural strengthening process (see FIG. 3) in which the secondary reaction and the tertiary reaction are sequentially performed.

Specifically, referring to FIG. 2, the preparation method according to the embodiment of the present invention may prepare a metal oxide-silica composite wet gel, in which the network structure is strengthened, by sequentially adding the second water glass solution and the second acid catalyst to the metal oxide-silica composite agglomerate and performing the secondary reaction.

Also, referring to FIG. 3, the preparation method according to the another embodiment of the present invention may prepare a first metal oxide-silica composite wet gel, in which the network structure is strengthened, by sequentially adding the second water glass solution and the second acid catalyst to the metal oxide-silica composite agglomerate and performing the secondary reaction (primary structural strengthening process), and may prepare a second metal oxide-silica composite wet gel, in which the network structure is further strengthened, by sequentially adding the third water glass solution and the third acid catalyst to the prepared first metal oxide-silica composite wet gel and performing the tertiary reaction (secondary structural strengthening process).

As described above, the preparation method according to the embodiment of the present invention may prepare a structurally strengthened metal oxide-silica composite wet gel by performing the structural strengthening process through the secondary reaction or the secondary reaction and the tertiary reaction, and thus, the shrinkage phenomenon occurred during drying to be described later may be suppressed to inhibit structural collapse. As a result, a metal oxide-silica composite aerogel having high porosity characteristics, such as high specific surface area and high pore volume, may be prepared.

The preparation method according to the embodiment of the present invention may further include a step of adding a fourth water glass solution and a fourth acid catalyst and performing a quaternary reaction after the secondary reaction and the tertiary reaction. In this case, the preparation method according to the embodiment of the present invention may perform a third structural strengthening process. In this case, the fourth water glass solution may be added so that a total amount of the fourth water glass solution, the second water glass solution, and the third water glass solution is in a range of 20 vol % to 200 vol % based on 100 vol % of the first water glass solution, and an amount of the fourth water glass solution may be adjusted depending on the amount of the second water glass solution and third water glass solution added.

Also, the fourth water glass solution may be the same material having the same water glass concentration as the second water glass solution, and the fourth acid catalyst may be the same as the first acid catalyst or may be included in the first acid catalyst.

Furthermore, the quaternary reaction may be performed under the same conditions as the secondary reaction.

Step 3 is a step of drying the metal oxide-silica composite wet gel for the preparation of the metal oxide-silica composite aerogel.

In this case, in the preparation method according to the embodiment of the present invention, a step of washing may be further performed before the drying, and the washing is to obtain a high purity metal oxide-silica composite aerogel by removing impurities (e.g., unreacted products, by-products, etc.) generated during the reaction, wherein the washing is not particularly limited and may be performed by a conventional method in the art.

For example, the washing may be performed by adding distilled water or an organic solvent to the metal oxide-silica composite wet gel and stirring for 20 minutes to 1 hour, and the organic solvent is not particularly limited, but, for example, may be alcohol. In a case in which the washing is performed by using the organic solvent, since water present in the metal oxide-silica composite wet gel is substituted with alcohol having a relatively low surface tension, the shrinkage phenomenon occurred during drying may be further suppressed.

The drying may be performed by atmospheric pressure drying at a temperature of 100° C. to 190° C. for 1 hour to 4 hours after a water layer is separated and removed from the metal oxide-silica composite wet gel.

Also, the present invention provides a metal oxide-silica composite aerogel prepared by the above preparation method.

The aerogel according to an embodiment of the present invention may be one in which silica is doped with metal oxide, and the metal oxide may be a combination of magnesium oxide (MgO) and calcium oxide (CaO). That is, the aerogel may include magnesium oxide (MgO), calcium oxide (CaO), and silica ($SiO_2$).

Herein, the doping denotes that a limited amount of a foreign material is added to a pure material, and, for example, may denote that the metal oxide is bonded in a network structure of the silica.

The aerogel according to the embodiment of the present invention may have a specific surface area of 400 m$^2$/g to 800 m$^2$/g and a tap density of 0.12 g/ml or less.

Also, the metal oxide-silica composite aerogel may have a pore volume of 1.2 cm$^3$/g to 3.0 cm$^3$/g and a pore diameter of 10 nm to 25 nm.

Hereinafter, the present invention will be described in more detail, according to the following examples and experimental examples. However, the following examples and experimental examples are merely presented to exemplify the present invention, and the scope of the present invention is not limited thereto.

Example 1

A metal oxide-silica composite aerogel was prepared through steps illustrated in FIG. 2.

Specifically, a metal ion solution (metal ion concentration 0.5 M, $Mg^{2+}:Ca^{2+}=2:1$ molar ratio) including hydrochloric acid was added to a first water glass solution (water glass concentration 0.33 M) at a volume ratio of 1:1 based on the water glass solution to prepare a metal oxide-silica composite agglomerate. A second water glass solution (water glass concentration 0.5 M) was added to the agglomerate in an amount of 134 vol % based on 100 vol % of the first water glass solution and mixed, and hydrochloric acid was then added until a pH value became 5 (about 60% of a pH value before the addition) and reacted to prepare a metal oxide-silica composite wet gel. The prepared metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel. Total reaction time was 2 hours. In this case, a molar ratio of silica ($SiO_2$) in the water glass solution used in the overall reaction to metal ions ($Mg^{2+}$ and $Ca^{2+}$) in the metal ion solution was 2:1.

Example 2

A metal oxide-silica composite aerogel was prepared in the same manner as in Example 1 except that a second water glass solution having a water glass concentration of 0.83 M was used in an amount of 80.7 vol % based on 100 vol % of the first water glass solution. In this case, a molar ratio of silica ($SiO_2$) in the water glass solution used in the overall reaction to metal ions ($Mg^{2+}$ and $Ca^{2+}$) in the metal ion solution was 2:1.

Example 3

A metal oxide-silica composite aerogel was prepared in the same manner as in Example 1 except that a second water glass solution having a water glass concentration of 3.0 M was used in an amount of 22.3 vol % based on 100 vol % of the first water glass solution. In this case, a molar ratio of silica ($SiO_2$) in the water glass solution used in the overall reaction to metal ions ($Mg^{2+}$ and $Ca^{2+}$) in the metal ion solution was 2:1.

Example 4

A metal oxide-silica composite aerogel was prepared through steps illustrated in FIG. 3.

Specifically, a metal ion solution (metal ion concentration 0.5 M, $Mg^{2+}:Ca^{2+}=2:1$ molar ratio) including hydrochloric acid was added to a first water glass solution (water glass concentration 0.33 M) at a volume ratio of 1:1 based on the water glass solution to prepare a metal oxide-silica composite agglomerate. A second water glass solution (water glass concentration 0.83 M) was added to the agglomerate in an amount of 40.35 vol % based on 100 vol % of the first water glass solution and mixed, and hydrochloric acid was then added until a pH value became 5 (about 60% of a pH value before the addition) and reacted to prepare a first metal oxide-silica composite wet gel. A third water glass solution (water glass concentration 0.83 M) was added thereto in an amount of 40.35 vol % based on 100 vol % of the first water glass solution and mixed, and hydrochloric acid was then added until the pH value became 5 (about 60% of the pH value before the addition) and reacted to prepare a second metal oxide-silica composite wet gel. The prepared second metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel. Total reaction time was 2 hours. In this case, a molar ratio of silica ($SiO_2$) in the water glass solution used in the overall reaction to metal ions ($Mg^{2+}$ and $Ca^{2+}$) in the metal ion solution was 2:1.

Example 5

A metal oxide-silica composite aerogel was prepared in the same manner as in Example 4 except that a second water glass solution and a third water glass solution each having a water glass concentration of 2 M were used in an amount of 16.75 vol % based on the first water glass solution, respectively. In this case, a molar ratio of silica ($SiO_2$) in the water glass solution used in the overall reaction to metal ions ($Mg^{2+}$ and $Ca^{2+}$) in the metal ion solution was 2:1.

Example 6

A metal ion solution (metal ion concentration 0.5 M, $Mg^{2+}:Ca^{2+}=2:1$ molar ratio) including hydrochloric acid was added to a first water glass solution (water glass concentration 0.33 M) at a volume ratio of 1:1 based on the water glass solution to prepare a metal oxide-silica composite agglomerate. A second water glass solution (water glass concentration 0.83 M) was added to the agglomerate in an amount of 26.9 vol % based on 100 vol % of the first water glass solution and mixed, and hydrochloric acid was then added until a pH value became 5 (about 60% of a pH value before the addition) and reacted to prepare a first metal oxide-silica composite wet gel. A third water glass solution (water glass concentration 0.83 M) was added thereto in an amount of 26.9 vol % based on 100 vol % of the first water glass solution and mixed, and hydrochloric acid was then added until the pH value became 5 (about 60% of the pH value before the addition) and reacted to prepare a second metal oxide-silica composite wet gel. A fourth water glass solution (water glass concentration 0.83 M) was added thereto in an amount of 26.9 vol % based on 100 vol % of the first water glass solution and mixed, and hydrochloric acid was then added until the pH value became 5 (about 60% of the pH value before the addition) and reacted to prepare a third metal oxide-silica composite wet gel. The prepared third metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel. Total reaction time was 2 hours. In this case, a molar ratio of silica ($SiO_2$) in the water glass solution used in the overall reaction to metal ions ($Mg^{2+}$ and $Ca^{2+}$) in the metal ion solution was 2:1.

Example 7

A metal oxide-silica composite aerogel was prepared in the same manner as in Example 2 except that a first water glass solution having a water glass concentration of 0.25 M was used and a second water glass solution was used in an amount of 90.4 vol % based on 100 vol % of the first water glass solution. In this case, a molar ratio of silica ($SiO_2$) in the water glass solution used in the overall reaction to metal ions ($Mg^{2+}$ and $Ca^{2+}$) in the metal ion solution was 2:1.

Example 8

A metal oxide-silica composite aerogel was prepared in the same manner as in Example 4 except that a first water glass solution having a water glass concentration of 0.25 M was used, and a second water glass solution and a third water glass solution were used in an amount of 45.2 vol % based on 100 vol % of the first water glass solution, respectively. In this case, a molar ratio of silica ($SiO_2$) in the water glass solution used in the overall reaction to metal ions ($Mg^{2+}$ and $Ca^{2+}$) in the metal ion solution was 2:1.

Example 9

A metal oxide-silica composite aerogel was prepared in the same manner as in Example 5 except that a first water glass solution having a water glass concentration of 0.25 M was used, and a second water glass solution and a third water glass solution were used in an amount of 18.75 vol % based on 100 vol % of the first water glass solution, respectively. In this case, a molar ratio of silica ($SiO_2$) in the water glass solution used in the overall reaction to metal ions ($Mg^{2+}$ and $Ca^{2+}$) in the metal ion solution was 2:1.

Example 10

A metal oxide-silica composite aerogel was prepared in the same manner as in Example 7 except that a metal ion solution having a metal ion concentration of 0.13 M was used. In this case, a molar ratio of silica ($SiO_2$) in the water glass solution used in the overall reaction to metal ions ($Mg^{2+}$ and $Ca^{2+}$) in the metal ion solution was 1:0.13.

Example 11

A metal oxide-silica composite aerogel was prepared in the same manner as in Example 7 except that a metal ion solution having a metal ion concentration of 1.0 M was used. In this case, a molar ratio of silica ($SiO_2$) in the water glass solution used in the overall reaction to metal ions ($Mg^{2+}$ and $Ca^{2+}$) in the metal ion solution was 1:1.

Comparative Example 1

A metal oxide-silica composite aerogel was prepared through steps illustrated in FIG. 1.

Specifically, a metal ion solution (metal ion concentration 0.17 M, $Mg^{2+}:Ca^{2+}=2:1$ molar ratio) including hydrochloric acid was added to a water glass solution (water glass concentration 0.5 M) at a volume ratio of 1:1.4 based on the water glass solution and reacted to prepare a metal oxide-silica composite wet gel. The metal oxide-silica composite wet gel was washed with ethanol, solid/liquid separation was then performed at a water content of less than 100%, and atmospheric pressure drying was performed in an oven at 150° C. for 1 hour to prepare a metal oxide-silica composite aerogel. Total reaction time was 2 hours. In this case, a molar ratio of silica ($SiO_2$) in the water glass solution used in the overall reaction to metal ions ($Mg^{2+}$ and $Ca^{2+}$) in the metal ion solution was 2:1.

Comparative Example 2

A metal oxide-silica composite aerogel was prepared in the same manner as in Comparative Example 1 except that a water glass solution having a water glass concentration of 1.0 M was used and a metal ion solution having a metal ion concentration of 0.33 M was used at a volume ratio of 1:1.5 based on the water glass solution. In this case, a molar ratio of silica ($SiO_2$) in the water glass solution used in the overall reaction to metal ions ($Mg^{2+}$ and $Ca^{2+}$) in the metal ion solution was 2:1.

Comparative Example 3

A metal oxide-silica composite aerogel was prepared in the same manner as in Example 1 except that a second water glass solution having a water glass concentration of 0.25 M was used in an amount of 268 vol % based on 100 vol % of the first water glass solution. In this case, a molar ratio of silica ($SiO_2$) in the water glass solution used in the overall reaction to metal ions ($Mg^{2+}$ and $Ca^{2+}$) in the metal ion solution was 2:1.

Comparative Example 4

A metal oxide-silica composite aerogel was prepared in the same manner as in Example 3 except that a second water glass solution having a water glass concentration of 4.0 M was used in an amount of 16.8 vol % based on 100 vol % of the first water glass solution. In this case, a molar ratio of silica ($SiO_2$) in the water glass solution used in the overall reaction to metal ions ($Mg^{2+}$ and $Ca^{2+}$) in the metal ion solution was 2:1.

Comparative Example 5

A metal oxide-silica composite aerogel was prepared in the same manner as in Example 10 except that a metal ion solution having a metal ion concentration of 0.05 M was used. In this case, a molar ratio of silica ($SiO_2$) in the water glass solution used in the overall reaction to metal ions ($Mg^{2+}$ and $Ca^{2+}$) in the metal ion solution was 1:0.05.

Comparative Example 6

A metal oxide-silica composite aerogel was prepared in the same manner as in Example 10 except that a metal ion solution having a metal ion concentration of 1.5 M was used. In this case, a molar ratio of silica ($SiO_2$) in the water glass solution used in the overall reaction to metal ions ($Mg^{2+}$ and $Ca^{2+}$) in the metal ion solution was 1:1.5.

Experimental Example

In order to compare physical properties of the metal oxide-silica composite aerogels prepared in Examples 1 to 13 and Comparative Examples 1 to 6, tap density (g/ml), specific surface area (Brunauer-Emmett-Teller (BET), $m^2/g$), pore volume ($V_{pore}$ $cm^3/g$), and pore diameter ($D_{pore}$ nm) of each aerogel were measured, and the results thereof are presented in Table 1 below.

(1) Tap density (g/ml)

Tap density was measured using a tap density tester (Jolting Volumeter Type STAVII) after tapping 2,500 times.

(2) Specific surface area (BET, $m^2/g$), Pore volume ($V_{pore}$, $cm^3/g$), and Pore diameter ($D_{pore}$, nm)

Specific surface area, pore volume, and pore diameter were measured based on the amounts of nitrogen, which were adsorbed and desorbed according to partial pressure ($0.11 < p/p_o < 1$), using an ASAP 2010 analyzer (Micromeritics).

TABLE 1

| Category | Tap density (g/ml) | Specific surface area ($m^2/g$) | Pore volume ($cm^3/g$) | Pore diameter (nm) |
| --- | --- | --- | --- | --- |
| Example 1 | 0.11 | 450 | 1.36 | 10.5 |
| Example 2 | 0.10 | 500 | 1.98 | 10.4 |
| Example 3 | 0.12 | 450 | 1.24 | 10.0 |
| Example 4 | 0.09 | 700 | 2.51 | 12.8 |
| Example 5 | 0.09 | 650 | 2.01 | 12.2 |
| Example 6 | 0.09 | 700 | 2.49 | 12.7 |
| Example 7 | 0.09 | 490 | 1.31 | 11.4 |
| Example 8 | 0.08 | 670 | 2.30 | 13.4 |
| Example 9 | 0.09 | 625 | 1.86 | 10.2 |
| Example 10 | 0.11 | 530 | 1.26 | 10.4 |
| Example 11 | 0.11 | 550 | 1.20 | 10.1 |
| Comparative Example 1 | 0.085 | 400 | 0.47 | 8.8 |
| Comparative Example 2 | 0.092 | 380 | 0.51 | 4.9 |
| Comparative Example 3 | 0.16 | 500 | 1.60 | 13.0 |
| Comparative Example 4 | 0.25 | 350 | 0.70 | 10.7 |
| Comparative Example 5 | 0.13 | 535 | 0.94 | 9.8 |
| Comparative Example 6 | 0.14 | 480 | 0.89 | 9.5 |

As illustrated in Table 1, it was confirmed that the metal oxide-silica composite aerogels of Examples 1 to 11 prepared according to the embodiment of the present invention generally had increased specific surface areas, pore volumes, and pore diameters and low tap densities in comparison to the metal oxide-silica composite aerogels of Comparative Examples 1 to 6.

Specifically, as a result of comparing the metal oxide-silica composite aerogel of Example 1 prepared through a structural strengthening step as illustrated in FIG. 2 according to the embodiment of the present invention and the metal oxide-silica composite aerogels of Comparative Examples 1 and 2 prepared by a preparation method which did not include the structural strengthening step, although the ratios of silica to metal ions used were the same, the pore volume, pore diameter, and specific surface area of the metal oxide-silica composite aerogel of Example 1 were respectively increased to levels of 290% to 270%, levels of 120% to 210%, and levels of 110% to 120%, while the metal oxide-silica composite aerogel of Example 1 had a tap density similar to those of the metal oxide-silica composite aerogels of Comparative Examples 1 and 2. This indicated that the method of preparing a metal oxide-silica composite aerogel according to the embodiment of the present invention may easily prepare an aerogel having desired excellent physical properties by including the structural strengthening step.

Also, with respect to the metal oxide-silica composite aerogel of comparative Example 3, which was prepared through the structural strengthening step as illustrated in FIG. 2 according to the embodiment of the present invention, but was prepared by using the second water glass solution in which the water glass concentration was lower than a concentration suggested in the present invention, although the total usage ratio of silica to metal ions is the same and the metal oxide-silica composite aerogel of comparative Example 3 was prepared through the same structural strengthening step, the tap density was significantly increased by 45% or more in comparison to the metal oxide-silica composite aerogel of Example 1.

In addition, with respect to the metal oxide-silica composite aerogel of comparative Example 4, which was prepared through the structural strengthening step as illustrated in FIG. 2 according to the embodiment of the present invention, but was prepared by using the second water glass solution in which the water glass concentration was higher than the concentration suggested in the present invention, although the total usage ratio of silica to metal ions is the same and the metal oxide-silica composite aerogel of comparative Example 4 was prepared through the same structural strengthening step, the tap density was significantly increased by 220% or more, and the specific surface area and the pore volume were rapidly decreased to levels of 78% and 50%, respectively, in comparison to the metal oxide-silica composite aerogel of Example 3. This indicated that the concentration of the second water glass solution used in the structural strengthening step of the method of preparing a metal oxide-silica composite aerogel of the present invention may be an important factor for the preparation of an aerogel having desired physical properties.

The invention claimed is:

1. A method of preparing a metal oxide-silica composite aerogel, the method comprising steps of:
   (1) adding a metal ion solution having a concentration of metal ions in a range of 0.125 M to 1.0 M and comprising a first acid catalyst to a first water glass solution having a concentration of water glass in a range of 0.125 M to 1.0 M and performing a primary reaction to prepare a metal oxide-silica composite agglomerate;
   (2) adding a second water glass solution having a concentration of water glass in a range of 0.5 M to 3.0 M to the agglomerate and a second acid catalyst and performing a secondary reaction to prepare a metal oxide-silica composite wet gel; and
   (3) drying the metal oxide-silica composite wet gel,
   wherein the second water glass solution of step (2) is added in an amount of 5 vol % to 500 vol % based on 100 vol % of the first water glass solution.

2. The method of claim 1, wherein the metal ion solution is a binary metal ion solution including calcium ions ($Ca^{2+}$) and magnesium ions ($Mg^{2+}$).

3. The method of claim 2, wherein a molar ratio of the calcium ion ($Ca^{2+}$) to the magnesium ion ($Mg^{2+}$) in the metal ion solution is in a range of 1:0.3 to 1:3.0.

4. The method of claim 1, wherein the metal ion solution is added so that a volume ratio of the first water glass solution to the metal ion solution is in a range of 5:1 to 1:5.

5. The method of claim 1, wherein the primary reaction of step (1) is performed in a pH range of 4 to 7, and
   wherein the secondary reaction is performed in a pH range of 4 to 6.

6. The method of claim 1, wherein the second water glass solution of step (2) is added in an amount of 20 vol % to 200 vol % based on 100 vol % of the first water glass solution.

7. The method of claim 1, wherein the second water glass solution and the second acid catalyst of step (2) are sequentially added,
   wherein the second acid catalyst is added in an amount such that a pH value after the addition of the second acid catalyst is reduced by 40% to 65% of a pH value before the addition of the second acid catalyst.

8. The method of claim 1, further comprising adding a third water glass solution and a third acid catalyst and performing a tertiary reaction after step (2),
   wherein the third water glass solution is added so that a total amount of the third water glass solution and the second water glass solution is in a range of 20 vol % to 200 vol % based on 100 vol % of the first water glass solution,
   wherein a water glass concentration in the third water glass solution is in a range of 0.5 M to 3.0 M.

9. The method of claim 8, wherein the third water glass solution and the third acid catalyst are sequentially added,
   wherein third acid catalyst is added in an amount such that a pH value after the addition of the third acid catalyst is reduced by 40% to 65% of a pH value before the addition of the third acid catalyst.

10. The method of claim 1, wherein the drying of step (3) is performed by atmospheric pressure drying at a temperature of 100° C. to 190° C. for 1 hour to 4 hours.

* * * * *